United States Patent [19]

Wright, Jr.

[11] 3,916,242

[45] Oct. 28, 1975

[54] ELECTRODE SEAL AND ELECTRODE MOUNT FOR ALKALI-METAL VAPOR LAMPS

[75] Inventor: William H. Wright, Jr., Neptune, N.J.

[73] Assignee: The United States of America as represented by the Secretary of the Army, Washington, D.C.

[22] Filed: July 30, 1974

[21] Appl. No.: 493,001

[52] U.S. Cl. ............... 313/217; 313/220; 313/331
[51] Int. Cl.² ............................................ H01J 61/30
[58] Field of Search .................... 313/217, 220, 60

[56] References Cited
UNITED STATES PATENTS

| | | | |
|---|---|---|---|
| 2,280,886 | 4/1942 | Brace | 313/60 |
| 2,549,614 | 4/1951 | Leighton | 313/60 X |
| 2,919,362 | 12/1959 | Atlee | 313/60 X |
| 3,716,744 | 2/1973 | Delembre et al. | 313/220 |

*Primary Examiner*—R. V. Rolinec
*Assistant Examiner*—Darwin R. Hostetter
*Attorney, Agent, or Firm*—Nathan Edelberg; Robert P. Gibson; Arthur L. Bowers

[57] ABSTRACT

An electrode seal and an electrode mount for high power alkali-metal-vapor lamps is disclosed. The seal comprises a dual brazing which minimizes the chances of leakage, which is a common failure mode of such lamps. The electrode mount includes a pin which holds the electrode in place even if the weld securing the electrode in place fails. The dual brazing and the electrode mount of this invention aapreciably extend the average useful lifetime of alkali-metal-vapor lamps.

8 Claims, 4 Drawing Figures

ELECTRODE SEAL AND ELECTRODE MOUNT FOR ALKALI-METAL VAPOR LAMPS

The invention described herein may be manufactured, used, and licensed by or for the Government for Governmental purposes without the payment to me of any royalties thereon.

BACKGROUND OF THE INVENTION

This invention relates to high power alkali-metal-vapor lamps; and more particularly, to an electrode seal and an electrode mount for high power alkali-metal-vapor lamps.

High power alkali-metal-vapor lamps are, of course, old and well known in the art. These devices have various applications, such as serving as a source of pulsed infrared radiation. The input power to such lamps may be 40 kilowatts peak, with an average of 2.5 kilowatts. For alkali-metal-vapor lamps that have envelopes made from polycrystalline alumina with cesium as the alkali metal the approximate cost per lamp is $200.00. If the envelope is made of sapphire, the cost per lamps exceeds $1,000.00. Thus, it is not only desirable but from a cost standpoint also essential that these lamps have a rather long useful life. Unfortunately, the average useful life of such lamps presently available is under 35 hours. This invention provides alkali-metal-vapor lamps having a substantially longer average useful life by providing a new construction for such lamps.

Presently available high power alkali-metal-vapor lamps such as the cesium lamp mentioned above may, of course, fail for any number of different reasons. However, the more common failure mode of such lamps is leakage due to the failure of a braze. The braze provided in such lamps becomes brittle after use of the lamps and any slight movement may cause the braze to crack and a leak develops. When such a leak occurs, the lamp fails rather rapidly.

Another failure mode that frequently occurs is due to the manner in which the electrode is presently mounted. The electrode falls away from its mounting and arcing takes place. This arcing eventually destroys the lamp.

SUMMARY OF THE INVENTION

This invention provides a double brazing technique for high power alkali-metal-vapor lamps. This double brazing technique substantially increases the average life for such lamps. The inner braze will not oxidize and become brittle until the outer braze cracks. Further, even if both brazes eventually develop cracks the leak rate is the product of two leak rates and such a leak rate could be tolerated over a longer period of time without failure of the lamp unless, of course, both brazes developed a substantial leak, which is not likely. The double brazing also strengthens the overall structure thereby reducing the chances of cracking a braze due to mechanical stresses even after the braze becomes brittle.

In addition to the double brazing feature of the invention, this invention provides a special mount for the electrode. The electrode mount of this invention holds the electrode in place to prevent the arcing that may occur with prior art lamps. Thus, in lamps constructed in accordance with this invention, lamp failure due to electrode arcing is remote if not totally eliminated.

DESCRIPTION OF THE DRAWING

A complete understanding of the exact nature and the structural details of the invention can be obtained from the following detailed description of the invention when read in conjunction with the annexed drawing in which.

DETAILED DESCRIPTION OF THE INVENTION

Figure 1:
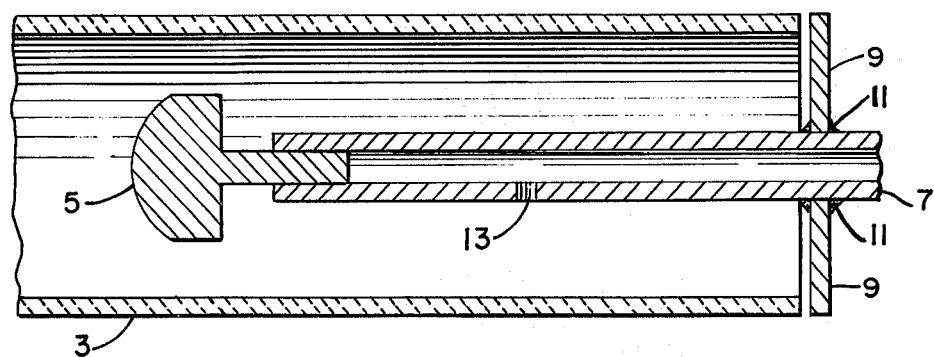
FIG. 1 is a fragmentary cross-sectional view of an alkali-metal-vapor lamp constructed in accordance with prior art techniques.

FIG. 1 is a partial showing of a prior art alkali-metal-vapor lamp. As shown in FIG. 1, the lamp 1 comprises an envelope 3, an electrode 5, a tube 7, and the disc 9. Envelope 3 is made of polycrystalline alumina or sapphire and is generally cylindrical in shape but can be of any desired appropriate shape.

Electrode 5 is made of tungsten or other suitable metal and is inserted in tube 7 as shown. Electrode 5 is welded to tube 7, which is made of tantalum or other suitable material, to hold the electrode in place. Tube 7 is also generally cylindrical in shape.

Disc 9 which is preferably a niobium disc is utilized to seal one end of envelope 3. Niobium disc 9 is secured to tantalum tube 7 by the braze 11. Titanium is used to braze niobium disc 9 to tantalum tube 7. This assembly is then secured to envelope 3 with a calcium-aluminate frit to seal this end of envelope 3. The other end of envelope 3 (not shown) is also sealed so that envelope 3 forms a sealed chamber housing electrode 5 and a part of tube 7. Of course, the end of envelope 3 not shown could be and generally is fabricated with niobium disc having no hole for the electrode mount. At the end not shown no tube is necessary and the tungsten electrode is mounted to the inside surface of the niobium disc.

After lamp 1 has been constructed, it is vacuum baked and then filled with, for example, cesium. The cesium is fed into the lamp 1 through tube 7 which is provided with the hole 13 which permits the cesium to enter envelope 3. After lamp 1 is cesium filled, tube 7 is pinched off and the electrical lead (not shown) is spot welded to tube 7.

The construction techniques just described are those presently used to construct high power alkali-metal-vapor lamps such as lamp 1. Lamps constructed in this manner have an average useful life of under 35 hours. The more common failure mode of such lamps is the failure of braze 11 between niobium disc 9 and tantalum tube 7. Braze 11 is originally quite ductile but becomes brittle due to oxidation. When braze 11 becomes brittle it cracks rather easily.

While lamps such as lamp 1 are generally operated in a vacuum environment or occasionally in an inert gas environment, braze 11 nevertheless becomes brittle. The operating temperature of such lamps is 600°C. or higher. At this high temperature the small amount of oxygen outgassed from tube 7 or present in the inert gas is sufficient to oxidize braze 11. When braze 11 is oxidized, it becomes so brittle that the slight movement caused by thermal cycling may cause it to crack and a leak develops in the lamp. In addition to the stress from thermal cycling, a slight side force on the electrical lead attached to tube 7 may be sufficient to crack braze 11 and cause a leak.

Another common failure mode in these prior art lamps occurs when electrode 5 falls away from tube 7. Due to the manner in which electrode 5 is secured to tube 7, electrode 5 has a tendency to fall away from tube 7. When this occurs arcing takes place, and this arcing burns away tube 7 and eventually the seal.

Figure 2:
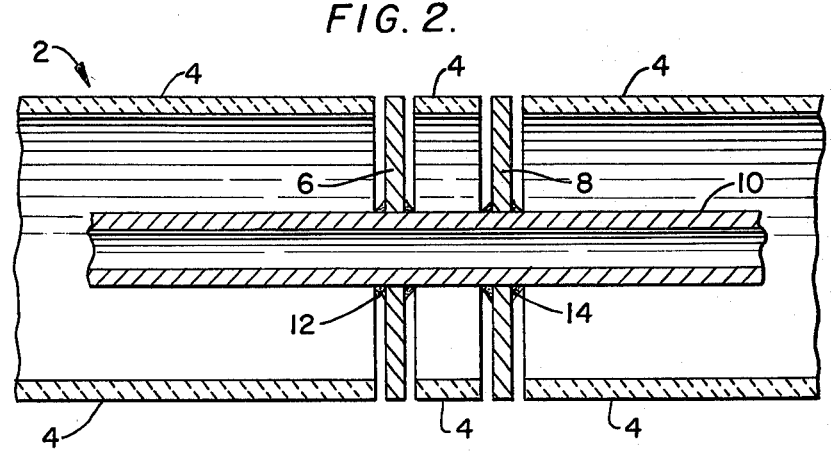
FIG. 2 is a fragmentary cross-sectional view of an alkali-metal-vapor lamp constructed in accordance with a first embodiment of this invention.
Figure 3:
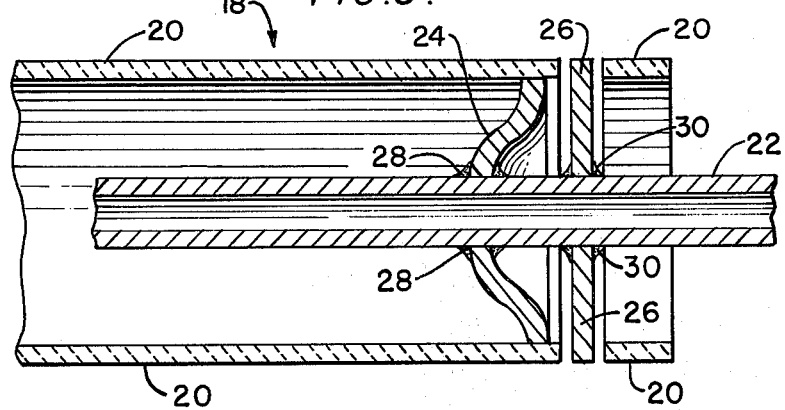
FIG. 3 is a fragmentary cross-sectional view of an alkali-metal-vapor lamp constructed in accordance with a second embodiment of this invention.
Figure 4:
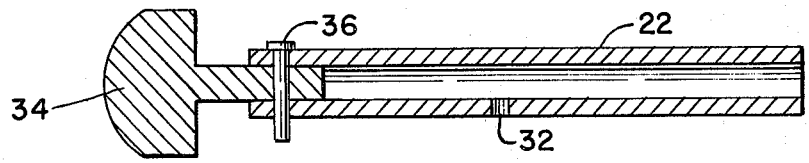
FIG. 4 shows the electrode mounting feature of this invention.

This invention, as exhibited in FIGS. 2, 3 and 4, obviates to a large extent the two failure modes described above. Referring first to FIG. 2, FIG. 2 is a partial showing of an alkali-metal-vapor lamp 2 comprising an envelope 4, the discs 6 and 8 and the tube 10. Envelope 4 is made of polycrystalline alumina or sapphire, discs 6 and 8 are niobium discs and tube 10 is made of tantalum.

Niobium discs 6 and 8 are secured to tube 10 by the brazes 12 and 14 respectively. Titanium is used for brazes 12 and 14. Niobium discs 6 and 8 are sealed to envelope 4 by calcium-aluminate frits (not shown). Of course, an electrode of tungsten or other suitable metal is secured in tube 10 as will be described later, and lamp 2 is outgassed, filled and then tube 10 is pinched off with an electrical lead attached as described above with reference to lamp 1 of FIG. 1.

By providing the two brazes 12 and 14 as compared to the single braze 11 of lamp 1 of FIG. 1, the lifetime of the lamp is substantially increased for the following reasons: (1) inner braze 12 is protected from oxidation until outer braze 14 fails, thus inner braze 12 remains ductile and less subject to being cracked until after outer braze 14 cracks; (2) no leakage develops until both brazes are cracked; (3) if both brazes do eventually crack the leak rate is the product of two leak rates, and such a leak rate can be tolerated over a long period of time without causing the lamp to fail; and (4) the mechanical stresses caused by any side force exerted by the electrical lead are substantially reduced by providing the dual braze and, therefore, the probability of cracking due to such a side force is substantially reduced even after enbrittlement.

FIG. 3 shows a second embodiment of the invention. Lamp 18 of FIG. 3 comprises an envelope 20 of polycrystalline alumina or sapphire, a tantalum tube 22, a dish-shaped niobium disc 24 and a flat niobium disc 26. Niobium discs 24 and 26 are secured to tube 22 by means of the titanium brazes 28 and 30, respectively. Discs 24 and 26 are secured to envelope 20 by calcium aluminate frits (not shown). Thus, lamp 18 of FIG. 3 is structurally similar to lamp 2 of FIG. 2. In lamp 2 both niobium discs are flat discs, whereas in lamp 18 the inner disc is dish shaped. Of course, all the statements made above with respect to the reasons for the increased average life of lamp 2 of FIG. 2 also apply to lamp 18.

In FIGS. 2 and 3 the tungsten electrode is not shown. FIG. 4 shows a tungsten electrode mounted in tube 22 in accordance with this invention. As has been mentioned, electrode 5 of lamp 1 may fall away from tube 7, and if this happens arcing will occur. This arcing will burn away tube 7 and eventually destroy braze 11. FIG. 4 shows a mount for the tungsten electrode that prevents this mode of failure.

In FIG. 4, a tungsten electrode 34 is inserted in tube 22 in the manner shown. Electrode 34 is secured to tube 22 by welding. In addition, tube 22 and electrode 34 both have small holes drilled therein for securing the pin 36 which when inserted through tube 22 and electrode 34 holds electrode 34 in place. Thus, even if the tungsten-tantalum weld securing electrode 34 to tube 22 fails, pin 36 will hold electrode 34 in place for satisfactory operation. The electrode mount shown in FIG. 4 would, of course, be used in both lamps 2 and 18.

From the foregoing description it should be apparent that this invention provides alkali-metal-vapor lamps that have a substantially longer lifetime as compared to the average lifetime of prior art alkali-metal-vapor lamps. Further, it should be apparent to those skilled in the art that various modifications and changes can be made to the embodiments shown and described without departing from the spirit and scope of the invention as set forth in the claims.

What is claimed is:

1. An alkali-metal-vapor lamp comprising:
   a. a hollow envelope;
   b. a first niobium end cap having a hole through the center thereof, said first niobium end cap being a dish-shaped disc;
   c. a second niobium end cap having a hole through the center thereof, said second niobium end cap having a hole being a flat disc;
   d. a tubular electrode mount passing through said hole of said first niobium end cap and through said hole of said second niobium end cap, said first and second niobium end caps being spaced apart along said tubular electrode mount;
   e. means to seal said first and second niobium end caps to said tubular electrode mount;
   f. means to seal said first and second niobium end caps to said envelope such that only a part of said tubular electrode mount extends into said envelope;
   g. an electrode; and
   h. means to secure said electrode to said tubular electrode mount.

2. An alkali-metal-vapor lamp as defined in claim 1 wherein said means to secure said first and second niobium end caps comprises first and second brazes, respectively.

3. An alkali-metal-vapor lamp as defined in claim 2 wherein said first and second brazes are titanium brazes.

4. An alkali-metal-vapor lamp as defined in claim 3 wherein said tubular electrode mount is made of tantalum.

5. An alkali-metal-vapor lamp as defined in claim 4 wherein said electrode is a tungsten electrode.

6. An alkali-metal-vapor lamp as defined in claim 5 wherein said means to secure said electrode to said tubular electrode mount comprises a weld and a pin passing through said tubular electrode mount and said electrode.

7. An alkali-metal-vapor lamp as defined in claim 6 wherein said envelope is made of polycrystalline alumina.

8. An alkali-metal-vapor lamp as defined in claim 6 wherein said envelope is made of sapphire.